US006975292B1

(12) United States Patent
Adachi

(10) Patent No.: US 6,975,292 B1
(45) Date of Patent: Dec. 13, 2005

(54) IMAGE DISPLAY APPARATUS FOR PHOTOGRAPHING AN OBJECT AND DISPLAYING THE PHOTOGRAPHED IMAGE

(75) Inventor: Kaoru Adachi, Asaka (JP)

(73) Assignee: Fuji Photo Film Co., LTD, Kanagawa (JP)

( * ) Notice: Subject to any disclaimer, the term of this patent is extended or adjusted under 35 U.S.C. 154(b) by 0 days.

(21) Appl. No.: 09/474,801

(22) Filed: Dec. 29, 1999

(30) Foreign Application Priority Data

Jan. 19, 1999 (JP) .................................. 11/010247

(51) Int. Cl.⁷ .............................................. G09G 3/34
(52) U.S. Cl. ...................... 345/81; 345/103; 345/104; 348/294; 348/333.01
(58) Field of Search .......................... 345/87, 55, 90, 345/81, 103, 104, 100; 250/208.1, 370.08, 250/377; 313/505; 348/282, 222.1, 333.13, 348/322, 323, 333.01, 294; 358/535; 438/60

(56) References Cited

U.S. PATENT DOCUMENTS

| 4,113,353 | A | * | 9/1978 | Matsushita ................... 359/636 |
| 4,775,891 | A | * | 10/1988 | Aoki et al. .................. 358/160 |
| 4,878,121 | A | * | 10/1989 | Hynecek ..................... 348/319 |
| 5,001,672 | A | * | 3/1991 | Ebbers et al. .......... 365/230.05 |
| 5,089,819 | A | * | 2/1992 | Yokosuka et al. .......... 341/101 |
| 5,140,440 | A | * | 8/1992 | Sasaki ........................ 358/453 |
| 5,270,711 | A | * | 12/1993 | Knapp ........................ 341/34 |
| 5,355,165 | A | * | 10/1994 | Kosonocky et al. ......... 348/311 |
| 5,365,303 | A | * | 11/1994 | Yamasaki et al. ............. 396/53 |
| 5,446,564 | A | * | 8/1995 | Mawatari et al. ............. 359/72 |
| 5,500,675 | A | * | 3/1996 | Arakawa et al. ............. 348/319 |
| 5,585,817 | A | * | 12/1996 | Itoh et al. ................... 345/104 |
| 5,716,867 | A | * | 2/1998 | Kim ............................. 438/60 |
| 6,127,998 | A | * | 10/2000 | Ichikawa et al. ............ 345/100 |
| 6,191,767 | B1 | * | 2/2001 | Mano et al. ................... 345/90 |
| 6,215,462 | B1 | * | 4/2001 | Yamada et al. ................ 345/76 |
| 6,400,404 | B2 | * | 6/2002 | Hirota et al. ................ 348/314 |
| 6,452,634 | B1 | * | 9/2002 | Ishigami et al. ............. 348/322 |
| 6,496,224 | B2 | * | 12/2002 | Ueno ......................... 348/322 |
| 6,618,090 | B1 | * | 9/2003 | Kidono et al. .............. 348/362 |

FOREIGN PATENT DOCUMENTS

| JP | 345553 | 7/1991 |
| JP | 564466 | 9/1993 |

* cited by examiner

Primary Examiner—Alexander Eisen
Assistant Examiner—Abbas Abdulselam
(74) Attorney, Agent, or Firm—Birch, Stewart, Kolasch & Birch

(57) ABSTRACT

In an imaging section, an image of an object is converted to signal charge by photodiodes arranged in the form of a matrix, the signal charge is transferred to output circuits by vertical transfer paths, and then the signal charge transferred to the output circuits is converted to signal voltage by the output circuits. The signal voltage is output from the output circuits to a signal conversion section as signals. The signal conversion section performs a processing for the signals in parallel, and outputs the processed signals to a display section. In the display section, signals are converted to voltage by input circuits, and the voltage is respectively applied to drain buses. A vertical driving circuit scans gate buses, and supplies gate driving pulses. Field effect transistors supplied with the gate driving pulses store charge in response to the voltage applied to liquid crystal devices, thus displaying an image.

11 Claims, 5 Drawing Sheets

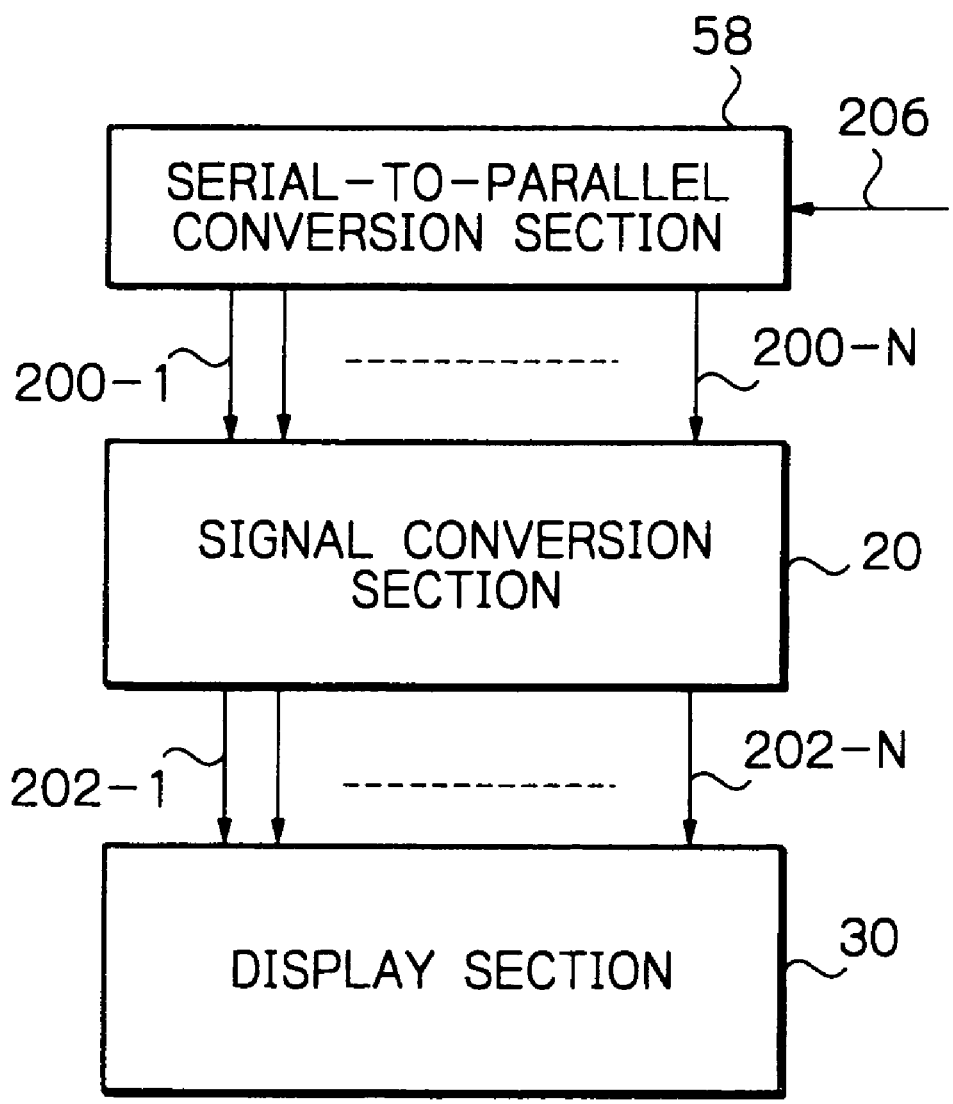

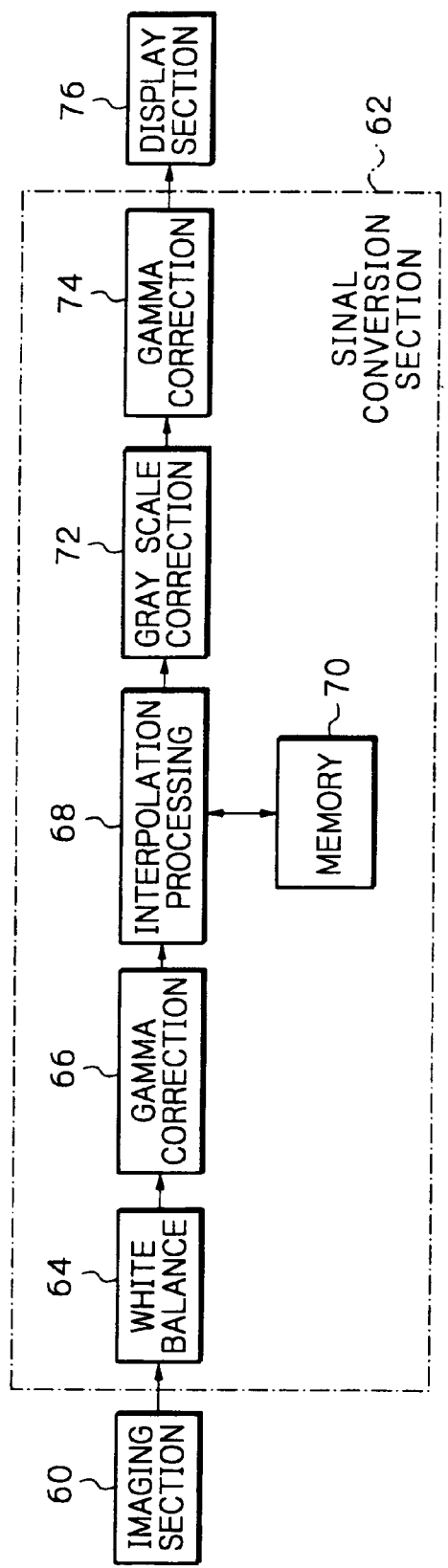

IMAGE DISPLAY APPARATUS FOR PHOTOGRAPHING AN OBJECT AND DISPLAYING THE PHOTOGRAPHED IMAGE

BACKGROUND OF THE INVENTION

1. Field of the Invention

The present invention relates to an image display apparatus for photographing an object by imaging devices and displaying the photographed image by a liquid crystal display and the like.

2. Description of the Background Art

In image display apparatus such as a video camera and a digital still camera, an image of an object is converted to an image signal by imaging devices, and the image signal undergoes an image processing to be displayed by a liquid crystal display and the like. FIG. 6 shows an example of a conventional image display apparatus. In FIG. 6, an imaging section 60 comprises, for example, CCD (Charge Coupled Device) imaging devices, converts an image of an object to an image signal and outputs the image signal to a signal conversion section 62. A white balance circuit 64 in the signal conversion section 62 adjusts the white balance of the image signal in response to a color temperature change. A gamma correction circuit 66 performs a processing to give a non-liniarity to the image signal.

Furthermore, in the case where the CCD imaging devices included in the imaging section 60 are color imaging devices having a color filter adopting the Bayer array or a G-stripe RB checkers array, an R-signal, a B-signal and a G-signal cannot be obtained simultaneously by the CCD imaging devices, so that if any processing is not performed, the image is displayed to be in a mosaic state. Accordingly, an interpolation processing circuit 68 in the signal conversion section 62 interpolates lacks of any of the R, B and G-signals by its interpolation processing.

When the pixels of the CCD imaging devices included either in a horizontal direction or in a vertical direction are different in number from those of a display section 76, an interpolation processing circuit 68 performs a thinning processing or an interpolation processing suitably using a memory circuit 70, whereby the number of pixels output from the CCD imaging devices is converted to be equal to that of the display section 76.

A gray scale correction circuit 72 in the signal conversion section 62 executes a gray scale correction such as a dither processing so that an image originated from the image signal processed looks better when it is displayed by the display section 76. A gamma correction circuit 74 performs a gamma correction for the image signal processed by the gray scale correction circuit 72 to output it to the display section 76. The display section 76 comprises, for example, an LCD (Liquid Crystal Display), and displays the image based on the image signal processed by the signal conversion section 62.

In the CCD imaging devices included in the imaging section 60, since signals generated by a large number of photodiodes, which are arranged two-dimensionally in the form of a matrix, are serially output on a pixel-by-pixel basis, the signal conversion section 62 has been obliged to process the signals serially. Since the refresh rate of the display section 76 is generally 60 Hz, the signal conversion section 62 had to process all signals of the pixels of one field, which are output from the CCD imaging devices, within a period of 1/60 seconds.

Although power consumption can be reduced by lowering a clock frequency in performing a digital signal processing, in the case of the image display apparatus, there is a certain limitation in reducing the clock frequency because the refresh rate of the display section 76 is generally not changeable, and it is difficult for the image display apparatus to be designed in reduced power consumption.

Furthermore, since a quantity of signals to be processed in the signal conversion section 62 becomes larger with an increase in number of the pixels of the CCD imaging devices, a high speed processing is required for the image display apparatus in order to process these signals within a certain period (1/60 seconds), and the clock frequency becomes higher, resulting in more increase in power consumption.

SUMMARY OF THE INVENTION

It is therefore an object of the present invention to provide an image display apparatus which is free from the drawbacks of the foregoing prior art, and improved in power consumption by performing a signal processing at a low speed.

To accomplish the foregoing subjects, an image display apparatus of the present invention comprises: an imaging section having photoelectric conversion devices arranged in the form of a matrix, the imaging section sequentially outputting signals generated by the photoelectric conversion devices in parallel column by column of the matrix; and a display section having display devices arranged in the form of a matrix, which displays an image represented by the signals applied thereto at the time of application of driving pulses, the display section applying the signals output in parallel from the imaging section to these display devices column by column and supplying the driving pulses line by line in a predetermined order.

Furthermore, an image display apparatus of the present invention comprises: an imaging section having photoelectric conversion devices arranged in the form of a matrix, the imaging section sequentially outputting signals generated by the photoelectric conversion devices in parallel column by column of the matrix; a signal conversion section for performing a processing for the signals output from the imaging section in parallel column by column and outputting the processed signals in parallel; and a display section having display devices arranged in the form of a matrix, which displays an image represented by signals applied thereto at the time of application of driving pulses, the display section applying the signals output in parallel from the signal conversion section to these display devices column by column and supplying the driving pulses line by line in a predetermined order.

Here, the image display apparatus may advantageously comprises a parallel-to-serial conversion section for converting the signals output in parallel from the signal conversion section to serial signals.

Furthermore, an image display apparatus of the present invention comprises: an imaging section having photoelectric conversion devices arranged in the form of a matrix, the imaging section sequentially outputting signals generated by the photoelectric conversion devices in parallel column by column of the matrix; a signal conversion section for performing a processing for the signals output in parallel from the imaging section column by column and outputting the processed signals in parallel; and a parallel-to-serial conversion section for converting the signals output in parallel from the signal conversion section to serial signals.

Still furthermore, an image display apparatus of the present invention comprises: a serial-to-parallel conversion section for converting signals serially input thereto to parallel signals and outputting the signals; and a display section having display devices arranged in the form of a matrix, which displays an image represented by signals applied thereto at the time of application of driving pulses, the display section applying the signals output in parallel from the serial-to-parallel conversion section to these display devices column by column and supplying the driving pulses row by row in a predetermined order.

BRIEF DESCRIPTION OF THE DRAWINGS

The objects and features of the present invention will become more apparent from consideration of the following detailed description taken in conjunction with the accompanying drawings in which:

FIG. 5 is a schematic block diagram showing an example of a display apparatus in accordance with the present invention; and FIG. 6 is a schematic block diagram showing an example of a conventional image display apparatus.

DESCRIPTION OF THE PREFERRED EMBODIMENTS

Figure 1:
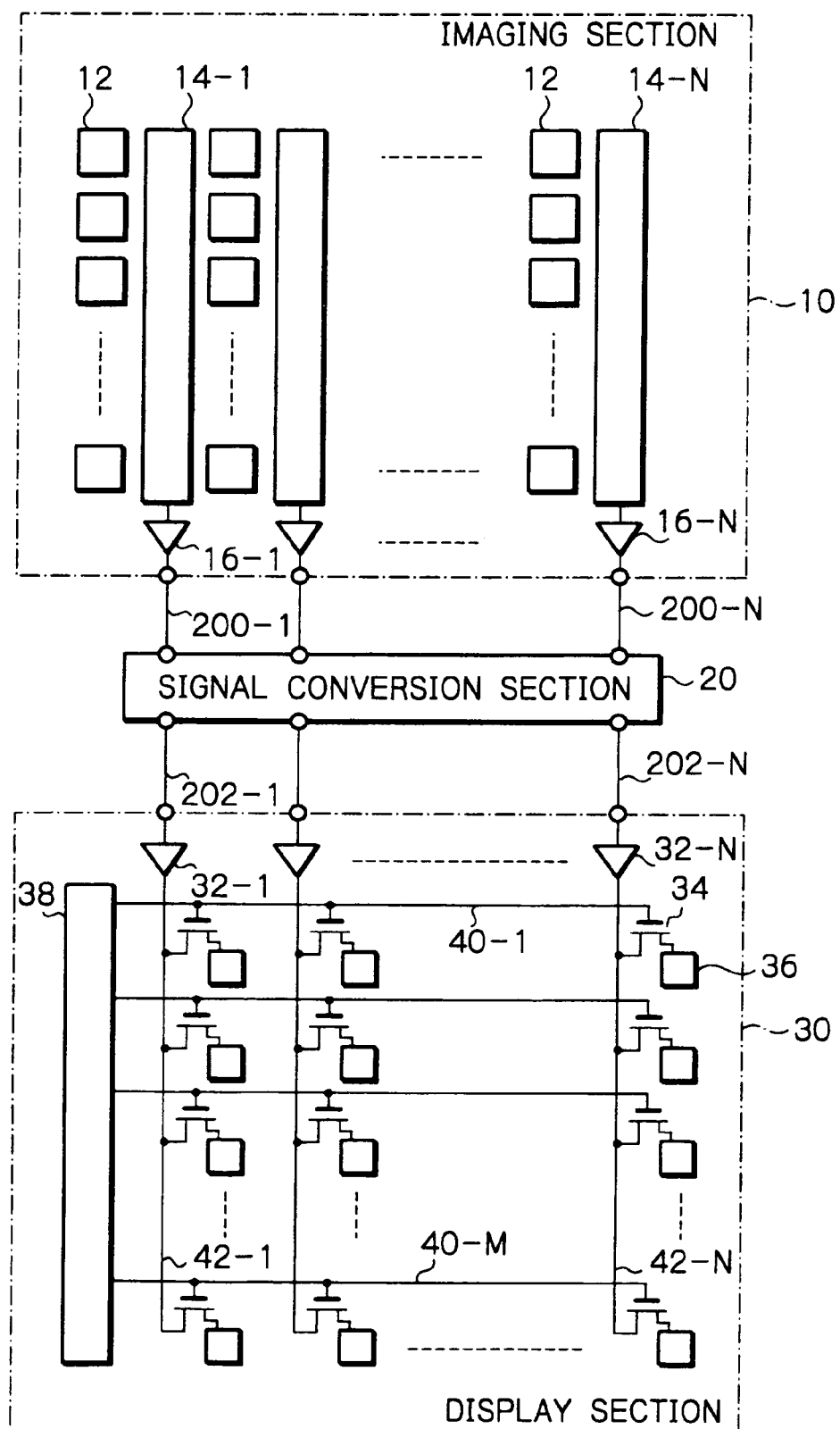
FIG. 1 is a schematic block diagram showing an embodiment of an image display apparatus in accordance with the present invention.

In FIG. 1, the image display apparatus converts an image of an object to an image signal by an imaging section 10, and performs a processing for the image signal by a signal conversion section 20, thus displaying an image by a display section 30. The image display apparatus can widely be applied to a video camera, a digital still camera and the like.

The imaging section 10 is, for example, an interline CCD. The imaging section 10 has a large number of photodiodes 12 arranged in an imaging region in the form of a matrix (M lines×N columns or 1 pixels) and vertical transfer paths 14-1 to 14-N arranged adjacent to the respective lines of the photodiodes 12. Each of the photodiodes 12 is connected to corresponding one of the vertical transfer paths 14-1 to 14-N via transfer gates (not shown), and each lower end of the vertical transfer paths 14-1 to 14-N is connected to corresponding one of output circuits 16-1 to 16-N.

Each of the photodiodes 12 converts the image of the object, which is focussed on its surface, to a signal charge pixel by pixel by a photoelectric conversion and stores it therein. Field shift pulses are alternately supplied to the transfer gates arranged in the odd-numbered lines and the transfer gates arranged in the even-numbered lines every field during a vertical blanking period. When the field shift pulses are supplied to the transfer gates, the signal charge stored in the photodiodes 12 moves to the vertical transfer paths 14-1 to 14-N through the transfer gates.

Vertical driving pulses are supplied to the vertical transfer paths 14-1 to 14-N during a horizontal blanking period. The signal charge in the vertical transfer paths 14-1 to 14-N is transferred toward output circuits 16-1 to 16-N in response to the vertical driving pulses. Every time a vertical driving pulse is supplied, each of the signal charge in the vertical transfer paths 14-1 to 14-N is moved toward corresponding one of the output circuits 16-1 to 16-N line by line, and sequentially arrives at corresponding one of the output circuits 16-1 to 16-N within one field period. The output circuits 16-1 to 16-N serially convert each of the signal charge arriving from the vertical transfer paths 14-1 to 14-N to a signal voltage, and output signals 200-1 to 200-N, respectively.

As described above, in this embodiment, the signal charge generated by the photodiodes 12 is transferred to the output circuits 16-1 to 16-N on the vertical transfer paths 14-1 to 14-N, and converted to the signal voltage by the output circuits 16-1 to 16-N path by path. Each of the output circuits 16-1 to 16-N outputs the signal voltage by one pixel per horizontal scanning period. That is, the signal voltage equivalent to N pixels (equivalent to one line) is output from the N output circuits in parallel.

Figure 2:
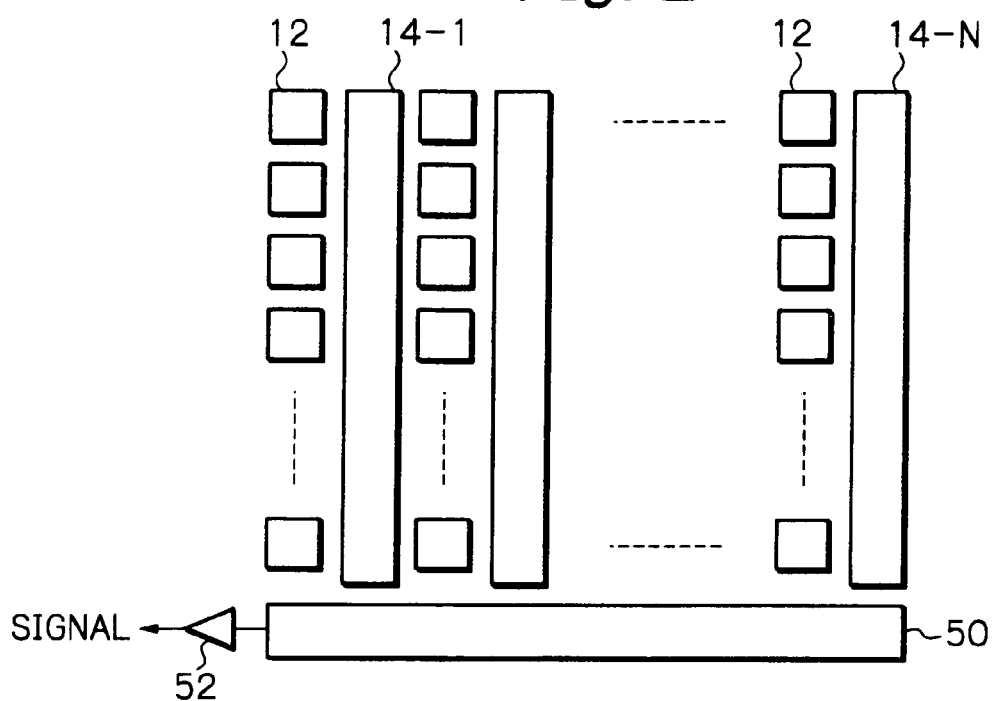
FIG. 2 is a drawing showing a constitution of an example of a conventional CCD.

FIG. 2 shows an example of a conventional CCD, which is illustrated for comparing it with the CCD of this embodiment. The conventional CCD comprises the photodiodes 12, the vertical transfer paths 14-1 to 14-N, a horizontal transfer path 50 and output circuit 52. The conventional CCD is different from the CCD in the imaging section 10 of FIG. 1 in that the lower ends of the vertical transfer paths 14-1 to 14-N are connected to a horizontal transfer path 50 and the left end of the horizontal transfer path 50 is connected to an output circuit 52.

In FIG. 2, the vertical driving pulses are supplied to the vertical transfer paths 14-1 to 14-N, and the horizontal driving pulses are supplied to the horizontal transfer path 50. The signal charge moved to the vertical transfer paths 14-1 to 14-N during the vertical blanking period is transferred toward the horizontal transfer path 50 line by line in response to the vertical driving pulses supplied during the horizontal blanking period. The signal charge arrived at the lower ends of the vertical transfer paths 14-1 to 14-N moves to the horizontal transfer path 50 sequentially.

In the above-described manner, every time the vertical driving pulses are supplied to the vertical transfer paths 14-1 to 14-N, the signal charge equivalent to one pixel is moved from each of the vertical transfer paths 14-1 to 14-N to the horizontal transfer path 50, that is, the signal charge equivalent to N pixels (equivalent to one line) is moved from the N vertical transfer paths 14-1 to 14-N to the horizontal transfer path 50 in parallel.

The horizontal transfer path 50 transfers the signal charge, which was moved from the vertical transfer paths 14-1 to 14-N, toward the output circuit 52 in response to the horizontal driving pulses repeatedly supplied during the horizontal scanning period. The signal charges equivalent to one line, which were moved to the horizontal transfer 50, sequentially arrive at the output circuit 52 within one horizontal scanning period. The output circuit 52 converts the arrived signal charge to a signal voltage and outputs the signal voltage.

As described above, in the conventional CCD of FIG. 2, the signal charge, which has been photoelectrically converted by the photodiodes 12 arranged in the form of a matrix, is transferred by the vertical transfer paths 14-1 to 14-N, and moved to the horizontal transfer path 50. The signal charge is transferred from the horizontal transfer path 50 to the output circuit 52, and the signal voltage corresponding to the N pixels is serially output from the output circuit 52 every horizontal scanning period.

Contrary to this, in the imaging section 10 according to this embodiment of FIG. 1, the signal charge transferred by the vertical transfer paths 14-1 to 14-N is transferred to the output circuits 16-1 to 16-N connected to the respective vertical transfer paths 14-1 to 14-N, and the signal voltage equivalent to one pixel is output from each of the output circuits 16-1 to 16-N every horizontal scanning period. The N signal voltages equivalent to N pixels are output from the N output circuits in parallel every horizontal scanning period.

Accordingly, in the imaging section 10 of this embodiment, since the imaging section 10 does not have the horizontal transfer path 50 provided in the conventional CCD, the horizontal driving pulse to be supplied to the horizontal transfer path is unnecessary, so that power consumption can be more reduced. Although the CCD is employed for the imaging section 10 in this embodiment, other types of imaging device such as a MOS (Metal Oxide Semiconductor) imaging device may be employed.

The signal conversion section 20 is connected to the imaging section 10 of FIG. 1. The signal conversion section 20 has input terminals of the same number as the number (N) of the output circuits 16 in the imaging section 10, and the output circuits 16-1 to 16-N are connected to the respective input terminals. The signal conversion section 20 receives signals 200-1 to 200-N in parallel, which are output from the output circuits 16-1 to 16-N of the imaging section 10, and performs the same processing as that of the signal conversion section 62 of FIG. 6, for the signals 200-1 to 200-N in parallel, thus outputting signals 202-1 to 202-N, which have been processed, from N output terminals in parallel.

Since the signal conversion section 20 of this embodiment processes the signals 200-1 to 200-N output from the imaging section 10 in parallel, a signal processing speed can be made slower than that of the conventional signal conversion section 62 of FIG. 6. Assuming that one horizontal scanning period is, for example, 65 $\mu$s, while the conventional signal conversion section 62 has to process a signal equivalent to one pixel within a period of 65 $\mu$s per horizontal pixels N, the signal conversion section 20 of this embodiment may process a signal equivalent to one pixel within a period of 65 $\mu$s, so that power consumption can be more reduced.

Since the number of pixels of the imaging section 10 in the horizontal direction is set to be equal to that of the display section 30, the number of inputs of the signal conversion section 20 and the number of outputs are thereof equal to each other, that is, N. However, when the number of pixels of the display section 30 in the horizontal direction is different from that of the imaging section 10, since the signal conversion section 20 performs a signal processing so that the number of outputs of the section 20 becomes equal to the number of pixels of the display in the horizontal direction, the number of outputs of the section 20 varies in accordance with the number of pixels of the display section 30 in the horizontal direction.

The display section 30 is connected to the signal conversion section 20. This display section 30 is, for example, a liquid crystal display (LCD), and has a structure that a plurality of display devices composed of field effect transistors 34 and liquid crystal devices 36 are arranged in the form of a matrix (M lins×N columns). Each of the field effect transistors 34 operates as a switch, and allows its source and drain to be conductive with each other when a voltage is applied to its gate. Each of the liquid crystal devices 36 is connected to the source of corresponding one of the field effect transistors 34, and stores charge in response to the voltage applied to the drain of the field effect transistor 34 when this transistor 34 is made to be in a conduction state.

The gate of each of the field effect transistors 34 is connected to corresponding one of gate buses 40-1 to 40-M line by line, and one end of each of the gate buses is connected to a vertical driving circuit 38. The drain of each of the field effect transistors 34 is connected to corresponding one of drain buses 42-1 to 42-N column by column, and one end of each of the drain buses 42-1 to 42-N is connected to an output port of corresponding one of input circuits 32-1 to 32-N. Input ports of the input circuits 32-1 to 32-N are connected to respective output terminals of the signal conversion section 20. The input circuits 32-1 to 32-N receive signals 202-1 to 202-N output from the signal conversion section 20, respectively, and output predetermined voltage to the drain buses 42-1 to 42-N, respectively.

When the vertical driving circuit 38 refreshes, for example, an image display every field, the vertical driving circuit 38 alternately scans the gate buses arranged in the odd-numbered lines and the gate buses arranged in the even-numbered lines every field period sequentially in response to the horizontal synchronous signal, and outputs a gate driving pulse to the gate bus scanned.

When the gate driving pulse is supplied to the gate bus 40 connected to the gate of the field effect transistor 34, the drain and source of the field effect transistor 34 are made conductive. On the other hand, the signals 202-1 to 202-N are input to the input circuits 32-1 to 32-N from the signal conversion section 20 in synchronization with the gate driving pulse, and the input circuits 32-1 to 32-N supply voltage corresponding to the signals to the drain buses 42-1 to 42-N, respectively.

For example, when the gate driving pulse is supplied to the gate bus 40-1 from the vertical driving circuit 38 and voltage corresponding to the signals 202-1 to 202-N is supplied from the input circuits 32-1 to 32-N to the drain buses 42-1 to 42-N, the field effect transistors 34 connected to the gate bus 40-1 are made to be in their conduction state, and charge associated with the magnitudes of the voltage applied to the drains of the field effect transistors 34 is stored in the liquid crystal devices 36.

The vertical driving circuit 38 scans all of the gate buses 40-1 to 40-M within two-field period in a predetermined order in response to the horizontal synchronous signal, and supplies the gate driving voltage to the gate bus scanned. The input circuits 32-1 to 32-N output the voltage, which corresponds to the signals 202-1 to 202-N from the signal conversion section 20, to the drain buses 42-1 to 42-N in synchronization with the horizontal synchronous signal.

Accordingly, the charge corresponding to the magnitudes of the signals 202-1 to 202-N is stored in the liquid crystal devices 36 arranged in the form of a matrix, and held therein. Immediately after the charge is stored in the liquid crystal device 36, the state of the liquid crystal forming the liquid crystal device 36 changes in response to the quantity of the charge, the liquid crystal device 36 allows light guided from the back light disposed behind the device 36 to be shield or passed therethrough in response to the quantity of the charge stored.

Thus, an image represented by the signals 202-1 to 202-N, which are output from the signal conversion section 20, is displayed by the display section 30. The charge stored in the liquid crystal device 36 is updated every two fields in this embodiment. Although the LCD is used for the display section 30 of this embodiment, a display using an LED (Light Emitting Diode) as a display device may be employed.

Figure 3:
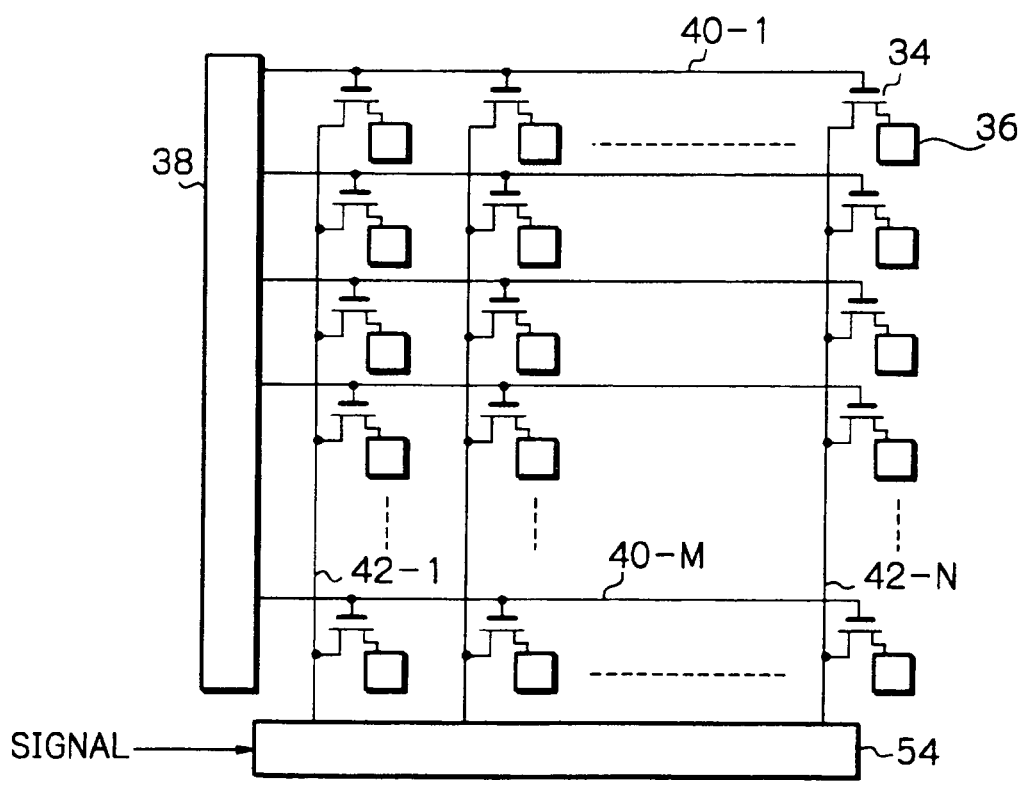
FIG. 3 schematically shows an example of the constitution of a conventional LCD.

FIG. 3 shows an example of a conventional LCD, which is illustrated for being compared with the LCD of this embodiment. Although this conventional LCD is the same as the display section 30 of FIG. 1 in constitution of the field effect transistors 34, the liquid crystal devices 36 and the vertical driving circuit 38 and in connection as to the gate buses 40-1 to 40-N and the drain buses 42-1 to 42-N, the conventional LCD differs from the display section 30 of FIG. 1 in that a horizontal register circuit 54 is provided instead of the input circuits 32-1 to 32-N and one end of each of the drain buses 42-1 to 42-N is connected to the horizontal register circuit 54.

In FIG. 3, the horizontal register circuit 54 is adapted to hold temporarily a signal equivalent to one line for the number N of pixels. The horizontal register circuit 54 sequentially receives a signal input thereto serially from the outside in response to clock signals, and sequentially shifts it. Then, when the horizontal register circuit 54 holds signals equivalent to one line, the horizontal register circuit 54 outputs the voltage corresponding to the signals held therein to the drain buses 42-1 to 42-N. The horizontal register circuit 54 executes such processing iteratively in timed with a horizontal synchronous signal, and outputs voltage corresponding to the signals 202-1 to 202-N, in synchronous with gate driving pulses which are output from the vertical driving circuit 38 to the drain buses 42-1 to 42-N.

As described above, in the conventional LCD of FIG. 3, the horizontal register circuit 54 is provided, which converts the signals serially input thereto line by line to the voltage corresponding to the signals in parallel and outputs the voltage to the drain buses 42-1 to 42-N in parallel. By contrast, since the display section 30 of this embodiment of FIG. 1 has a constitution that the voltage corresponding to the signals 202-1 to 202-N input from the signal conversion section 20 is supplied to the drain buses 42-1 to 42-N from the input circuits 32-1 to 32-N, the horizontal register circuit 54 need not be provided, nor clock signals supplied to the horizontal register circuit 54 are unnecessary, so that power consumption can be more reduced.

Depending on an application where the image display apparatus of this embodiment is used, the image display apparatus may have a constitution that the signal conversion section 20 is omitted and signals 200-1 to 200-N output from the imaging section 10 are directly input to the input circuits 32-1 to 32-N.

Figure 4:
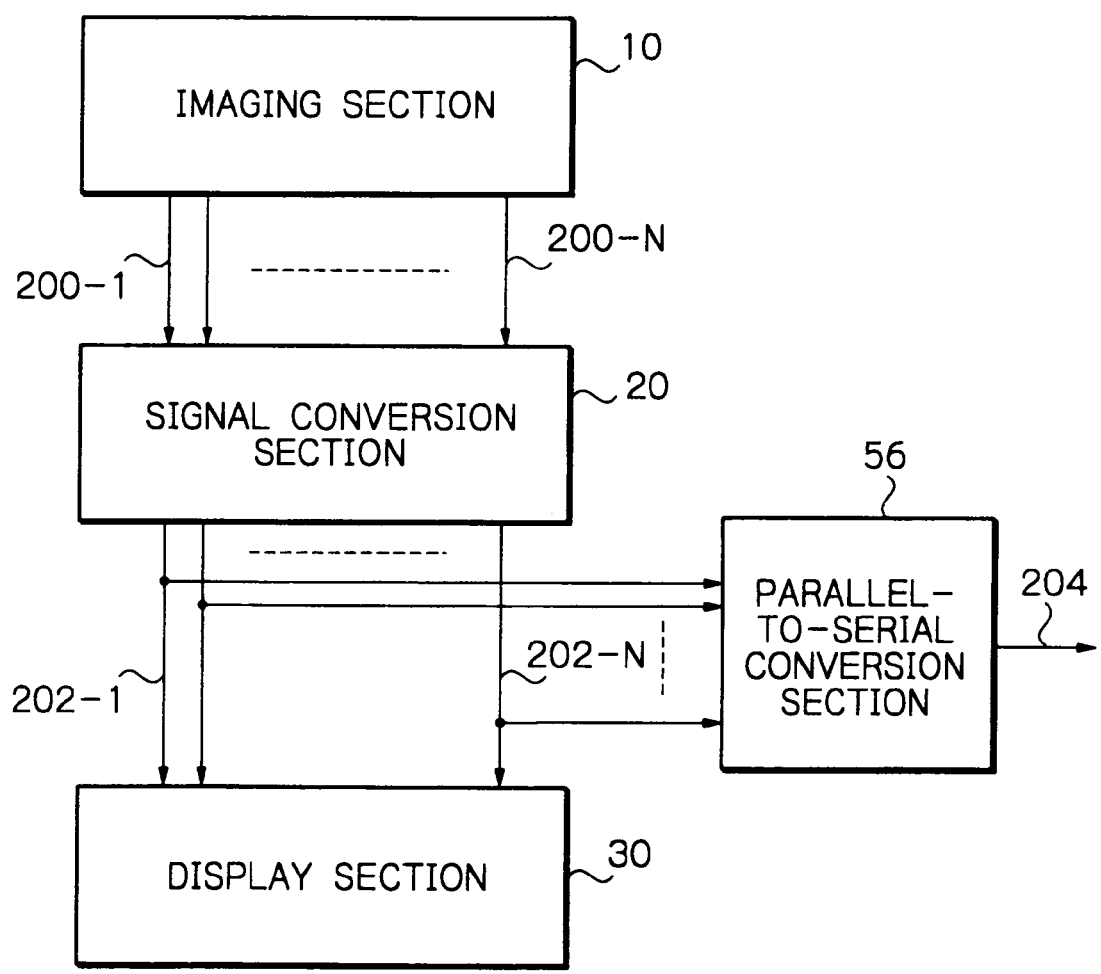
FIG. 4 is a schematic block diagram showing an alternativ embodiment of an image display apparatus in accordance with the present invention.

FIG. 4 shows an alternative embodiment of the image display apparatus according to the present invention. This image display apparatus has a constitution obtained by providing a parallel-to-serial conversion section 56 in the image display apparatus of FIG. 1. This parallel-to-serial conversion section 56 converts the signals 202-1 to 202-N, which are output in parallel from the signal conversion section 20, to serial signals 204 and outputs them. The section 56 outputs the signal similar to that generated by the conventional signal conversion section 62 shown in FIG. 6.

Also in this embodiment, power consumption can be reduced similarly to the embodiment of FIG. 1. It should be noted that the image display apparatus can be constituted by omitting the display section 30 of FIG. 4. In this case, the number of outputs of the signal conversion section 20 is not restricted to the number of pixels of the display section 30 in the horizontal direction.

FIG. 5 shows an embodiment of a display apparatus according to the present invention. In this display apparatus, the imaging section 10 of FIG. 1 is omitted and a serial-to-parallel conversion section 58 is provided. This serial-to-parallel conversion section 58 converts signals 206 serially input thereto to parallel signals 202-1 to 202-N and outputs them to the signal conversion section 20. Also in this embodiment, power consumption can be reduced similarly to the embodiment shown in FIG. 1.

The entire desclosure of Japanese patent application No. 10247/1999 filed on Jan. 19, 1999 including the specification, claims, accompanying drawings and abstract of the disclosure is incorporated herein by reference in its entirety.

While the present invention has been described with reference to the particular illustrative embodiments, it is not to be restricted by those embodiments. It is to be appreciated that those skilled in the art can change or modify the embodiments without departing from the scope and spirit of the present invention.

What is claimed is:

1. An image display apparatus comprising:
   an imaging section which is formed as a charge-coupled device (CCD) imaging device and converts an optical image to first signals representing the image,
   said imaging section including:
   photoelectronic conversion devices arranged in the form of a matrix formed by lines and columns for converting the optical image to signal charges,
   vertical transfer paths arranged adjacent to the respective columns of said photoelectronic conversion devices, each of said vertical transfer paths transferring the signal charges toward one end in accordance with vertical driving pulses,
   transfer gates for transferring the signal charges generated by said photoelectronic conversion devices to the respective vertical transfer paths in accordance with field shift pulses, and
   output circuits for converting the signal charges arrived at the one end of said vertical transfer paths to the first signals and outputting the first signals in parallel column by column of said matrix from said imaging section; and
   a display section which displays the image represented by the first signals,
   said display section including:
   display devices arranged in the form of a matrix, each of said display devices having an image signal input terminal and a control signal input terminal, and displaying the image represented by first signals applied to the image signal input terminal at the time of application of driving pulses to the control signal input terminal,
   input circuits comprising signal buses for receiving the first signals from said imaging section and outputting second signals corresponding to the received first signals to the image signal input terminals in parallel column by column of said matrix, and
   a vertical driving circuit for outputting the driving pulses to the control signal input terminals over control buses line by line of said matrix in a predetermined order.

2. The image display apparatus according to claim 1, wherein said display section comprises a liquid crystal display.

3. The image display apparatus according to claim 1, wherein said imaging section comprises a CCD imaging device with no horizontal transfer path.

4. An image display apparatus comprising:
   an imaging section which is formed as a charge-coupled device (CCD) imaging device and converts an optical image to first signals representing the image, said imaging section including:

photoelectronic conversion devices arranged in the form of a matrix formed by lines and columns for converting the optical image to signal charges, vertical transfer paths arranged adjacent to the respective columns of said photoelectronic conversion devices, each of said vertical transfer paths transferring the signal charges toward one end in accordance with vertical driving pulses, transfer gates for transferring the signal charges generated by said photoelectronic conversion devices to the respective vertical transfer paths in accordance with field shift pulses, and output circuits for converting the signal charges arrived at the one end of said vertical transfer paths to the first signals and outputting the first signals in parallel column by column of said matrix from said imaging section;

a signal conversion section for performing a processing on the first signals output from said imaging section in parallel column by column and outputting processed signals as second signals in parallel; and a display section which displays the image represented by the second signals, said display section including:

display devices arranged in the form of a matrix, each of said display devices having an image signal input terminal and a control signal input terminal, and displaying the image represented by the second signals applied to the image signal input terminal at the time of application of driving pulses to the control signal input terminal, input circuits comprising signal buses for receiving the second signals from said signal conversion section and outputting third signals corresponding to the received second signals to the image signal input terminals in parallel column by column of said matrix, and a vertical driving circuit for outputting the driving pulses to the control signal input terminals over control buses line by line of said matrix in a predetermined order.

5. The image display apparatus according to claim 4, wherein said display section comprises a liquid crystal display.

6. The image display apparatus according to claim 4, further comprising:

a parallel-to-serial conversion section for converting the second signals to serial signals.

7. The image display apparatus according to claim 4, wherein said imaging section comprises a CCD imaging device with no horizontal transfer path.

8. An image display apparatus comprising:

an imaging section which is formed as a charge-coupled device (CCD) imaging device and converts an optical image to first signals representing the image, said imaging section including:

photoelectronic conversion devices arranged in the form of a matrix formed by lines and columns for converting the optical image to signal charges, vertical transfer paths arranged adjacent to the respective columns of said photoelectronic conversion devices, each of said vertical transfer paths transferring the signal charges toward one end in accordance with vertical driving pulses, transfer gates for transferring the signal charges generated by said photoelectronic conversion devices to the respective vertical transfer paths in accordance with field shift pulses, and output circuits for converting the signal charges arrived at the one end of said vertical transfer paths to the first signals and outputting the first signals in parallel column by column of said matrix from said imaging section;

a signal conversion section for performing a processing on the first signals output in parallel from said imaging section column by column and outputting processed signals as second signals in parallel; and a parallel-to-serial conversion section for converting the second signals to serial signals.

9. The image display apparatus according to claim 8, wherein said imaging section comprises a CCD imaging device with no horizontal transfer path.

10. A display apparatus comprising:

a serial-to-parallel conversion section for converting first signals serially input thereto and representing an image to parallel second signals and outputting the second signals;

a signal conversion section for performing a processing on the second signals output in parallel from said serial-to-parallel conversion section column by column and outputting processed signals as third signals in parallel; and a display section which displays the image represented by the third signals, said display section including:

display devices arranged in the form of a matrix, each of said display devices having an image signal input terminal and a control signal input terminal, and displaying the image represented by third signals applied to the image signal input terminal at the time of application of driving pulses to the control signal input terminal, input circuits comprising signal buses for receiving the third signals from said signal conversion section and outputting fourth signals corresponding to the received third signals to the image signal input terminals in parallel column by column of said matrix, and a vertical driving circuit for outputting the driving pulses to the control signal input terminals over control buses line by line of said matrix in a predetermined order.

11. The display apparatus according to claim 10, wherein said display section comprises a liquid crystal display.

* * * * *